United States Patent [19]

Mix

[11] 4,132,761
[45] * Jan. 2, 1979

[54] GAS-LIQUID CONTACTING

[75] Inventor: Thomas W. Mix, Wellesley, Mass.

[73] Assignee: Merix Corporation, Wellesley, Mass.

[*] Notice: The portion of the term of this patent subsequent to Aug. 8, 1995, has been disclaimed.

[21] Appl. No.: 801,577

[22] Filed: May 31, 1977

Related U.S. Application Data

[63] Continuation-in-part of Ser. No. 689,178, May 24, 1976.

[51] Int. Cl.² ............................................. C01B 17/00
[52] U.S. Cl. ..................................... 423/242; 55/259; 261/105; 261/109; 261/110; 261/114 R; 423/659; 55/93; 55/95

[58] Field of Search ................. 261/94, 105, 109, 110, 261/114 R; 55/259, 73, 84, 87, 93, 94, 95; 202/158, 197; 423/242, 659

[56] References Cited

U.S. PATENT DOCUMENTS

| | | | |
|---|---|---|---|
| 3,653,812 | 4/1972 | Schneider et al. | 423/242 X |
| 3,765,659 | 10/1973 | Reilly | 261/114 R X |

*Primary Examiner*—William A. Cuchlinski, Jr.

[57] ABSTRACT

Gas-liquid contacting system featuring, in an $SO_2$ scrubbing embodiment, reduced liquid entrainment which, in various aspects, eliminates the need for liquid recirculation, and permits spray regime operation increasing the ratio of $SO_2$ absorption to sulfite oxidation. In various embodiments the entrainment is reduced by closely spaced vertical baffles above the tray, or a perforated plate or porous mesh beneath the tray.

22 Claims, 3 Drawing Figures

GAS-LIQUID CONTACTING

REFERENCE TO RELATED APPLICATION

This application is a continuation-in-part of my co-pending application Ser. No. 689,178, filed May 24, 1976, the disclosure of which is hereby incorporated by reference.

BACKGROUND OF THE INVENTION

This invention relates to gas-liquid contacting, and, in preferred embodiments, to removing $SO_2$ from a gas mixture, e.g., from the flue gas of a power generator.

In the conventional Wellman-Lord $SO_2$ scrubbing process a typical tower has from 3 to 5 absorber trays. The flue gas to be treated enters the base of the tower, and a sodium sulfite solution scrubbing liquid is fed to the top of the column. The liquid flows across the top tray, through a downcomer to the next tray, across that, and so forth until the solution exits from the bottom tray. The gas flows countercurrent to the liquid, and $SO_2$ is absorbed via the chemical reaction:

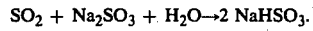

$$SO_2 + Na_2SO_3 + H_2O \rightarrow 2\ NaHSO_3.$$

The bisulfite rich liquid leaving the tower is regenerated to sulfite solution by heating, driving off concentrated $SO_2$ and precipitating sodium sulfite crystals.

In order to permit a low overall liquid feed rate while still maintaining an adequate liquid head on each tray in the face of liquid weeping and entrainment, conventional towers employ liquid recirculation at each stage. At each downcomer 90% of the liquid is recirculated to the tray inlet and only 10% passes to the tray below; thus, at each inlet 9 parts of recirculated liquid mix with one part of liquid from the tray above (or freshly regenerated liquid in the case of the top tray) for passage across the tray.

When oxygen in the flue gas contacts the scrubbing solution some of the sulfite is oxidized to $Na_2SO_4$. The sulfate is non-regenerable and must be purged from the system, resulting in a loss of active sodium.

Other aspects of the Wellman-Lord process are described in a United States Environmental Protection Agency publication entitled: EPA-600/2-76-008, Jan. 1976, "$SO_2$ Control Processes For Non-Ferrous Smelters", pp. 59—64, hereby incorporated by reference.

SUMMARY OF THE INVENTION

In one aspect the invention provides for $SO_2$ scrubbing without the need for liquid recirculation, by reducing liquid entrainment (preferably with an oscillation damping baffling system), thereby to achieve a high contacting rate at each tray with a very low liquid flow rate across the tray. The baffling system and certain other hardware used in this invention are described in detail in my above-identified copending application. The elimination of recirculation not only provides an equipment saving, but also increases the sulfite gradient (the sulfite to bisulfate ratio) —and hence the driving force for $SO_2$ absorption— on each tray.

In another aspect of the invention the reduction in entrainment is to a rate sufficiently below (e.g., 10–20% of) the rate of liquid supply to the tray to permit efficient spray regime operation on the trays, giving an advantage of high $SO_2$ absorption (because the absorption is for the most part a gas phase mass transfer controlled process) and a low sulfite oxidation (because the oxidation is for the most part a liquid phase mass transfer controlled process). This aspect of the invention is applicable to other gas-liquid contacting systems in which it is desired to have a high gas phase mass transfer rate and a low liquid phase mass transfer rate.

Other features and advantages of the invention will appear from the drawings and description of preferred embodiments thereof.

DESCRIPTION OF PREFERRED EMBODIMENTS

Figure 1:
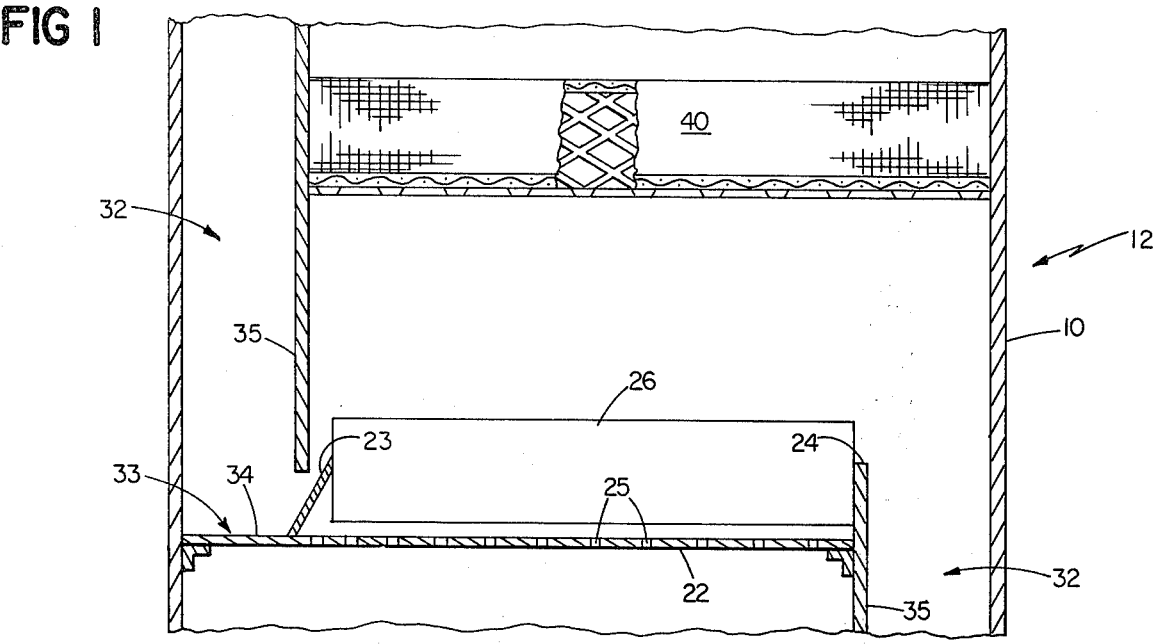
FIG. 1 is a semi-schematic, fragmentary, vertical sectional view of one stage of an $SO_2$ scrubbing column embodying the invention.

Referring to the drawings, cylindrical housing 10 of $SO_2$ scrubbing column 12 has below its bottom stage a central inlet (not shown) for the flue gas to be treated. A series of contact stages is vertically arranged inside housing 10. Considering an intermediate stage shown as typical, a plate 22 extends across housing 10. The downcomer 32 from the tray above carries scrubbing liquid (preferably a solution of $Na_2SO_3$) from the tray above to seal pan 33 with base 34. The liquid flows under downcomer apron 35 and over forward sloping inlet weir 23 (which preferably extends above apron 35) onto the active portion of tray 22 between the base of the inlet weir and vertical outlet weir 24. The clearance between the downcomer apron and the inlet weir, and the forward tilt of the inlet weir, are such as to cause the liquid to enter the tray as a relatively thin sheet with a forward and upward thrust.

The active section of plate 22 between inlet weir 23 and outlet weir 24 is perforated with holes 25, one-half inch in diameter on 1.2 inch square centers in the embodiment shown. The area of the holes thus amounts to 13.7% of the total area of the active section of the plate. In general, the plate free area should be chosen to be high enough so as not to give an unacceptably high plate pressure drop at design throughput, but not be be so high as to lead to excessive weeping at turndown. Furthermore, for spray regime operation the free area should be low enough so that the momentum of the gas flow through the plate is not substantially less than the liquid head on the tray.

Spaced, generally parallel, baffles 26 are located above the plate to limit and damp fluid oscillations by subdivision of the liquid-gas mixture above the plate. These baffles 26 run in the direction of liquid flow across the plate, are about 3 inches high, and are spaced across the plate. The baffles are spaced on 1.5 inch centers at the center of the plate, and are more closely spaced at the inlet and outlet, being slightly angled or curved to match the widening of the liquid flow area at the center of the plate. The baffles prevent formation of larger scale non-uniformities in the flow of liquid across the plate, and so enable a closer realization of the increase in plate efficiency over point efficiency due to the cross-flow effect by minimizing liquid eddying, backmixing, channeling, and bypassing.

The primary function of the baffles in the present invention is the reduction of amplitude of vertical fluid oscillations having a wavelength which is small relative to the width of the tray, and the consequent reduction of liquid entrainment. In the article "Perforated Plate Weeping", by Zanelli and del Bianco, *The Chemical Engineering Journal*, vol. 6, pp. 181-194 (1973), the text of which is hereby incorporated by reference as background and definitional information, such short wavelength (typically 10-20 cm.) oscillations are described and contrasted with transverse oscillations having a wavelength equal to twice the plate width.

Baffle spacing should in general be less than four inches plus one-half the outlet weir height for the baffles to be effective in limiting vertical oscillations. For most systems, the optimum baffle spacing will be less than 2½ inches. Baffle height should in general be equal to or greater than the average baffle center-to-center spacing.

The preferred embodiment shown also includes, downstream of the tray and baffles, a gas-liquid separator means of the impingement type in the form of one or more spaced layers of open cellular material 40, pleated or folded in zigzag fashion and disposed generally parallel to plate 22 across the gas flow path, with the vertices of the zigzag folds generally parallel to the direction of the liquid flow across the plate. The plate or folds extend at an angle of approximately 60° C. to the horizontal, although this may vary from 45° C. to 75° C. In the preferred embodiment shown, a single layer is used, consisting of a sheet of expanded metal with six plies of woven wire mesh on top of the expanded metal. The zigzag pattern generates a gas flow area significantly greater than the superficial column cross-section. The reduced velocity of the gas normal to the expanded metal and mesh surfaces (due to the zigzag pattern) makes for more effective deentrainment and makes reentrainment less likely. The steep slope of the mesh and expanded metal sections gives a gravitational force for liquid drainage down the sides of the mesh and expanded metal of 0.87 times the force of gravity and results in effective drainage down the sides of the separator to the base of the zigzag vees and from there back to the plate. Of great importance is the fact that the vertices of the zigzags are generally parallel to the direction of liquid flow across the plate so as not to interfere with movement down the plate of fluid rises up into the separator region. This orientation of the separator vertices therefore minimizes the increase in hydraulic gradient generated by the separator and minimizes the stage height requirements for the plate-separator combination. The importance of this orientation increases with increase in the depth of the vees.

The separator also contributes significantly to plate mass transfer, particularly at higher gas rates where the liquid flow rate into the separator is large, efficiency increasing as superficial gas velocity approaches the flood point.

Instead of the zigzag mesh, the separator may consist of chevron type baffles extending parallel to the direction of liquid flow along the plate, or other equivalent structures similarly having their major surfaces extending in the liquid flow direction and being at an angle of 45°-75° to the horizontal to minimize gas phase pressure drop.

Figure 2:
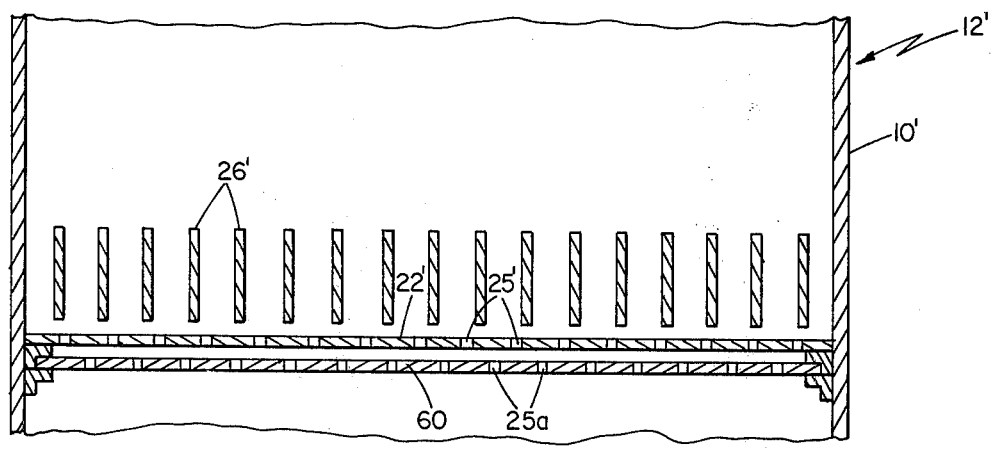
FIG. 2 is a vertical sectional view taken along a plane perpendicular to the section plane of FIG. 1 and showing an alternate embodiment of the invention in which a double perforated plate arrangement replaces the single plate of FIG. 1.

Referring to FIG. 2, the active section of plate 22' between inlet weir 23 and outlet weir 24 is perforated with ⅛ inch diameter holes 25' on ¾ inch centers. The area of the holes amounts to 35% (preferred range 15-55% for this embodiment) of the total active area of the plate. Spaced 3/16 inch below plate 22' is a similar plate 60 also perforated with ¾ inch holes 25a on ¾ inch centers. The holes in the two plates are preferably misaligned so that no vertical path directly down through both holes exists. The lower plate acts as a flow resistance and is sufficiently close to the underside of the main plate to substantially reduce pressure coupling between the underside of the tray and the main volume of gas beneath the tray. The space between these plates acts as a capacitance zone which is in series with the two flow resistances formed by the holes in the two plates. The staggering of the plate holes not only blocks pressure fluctuation transmittal, but also leads to the deentrainment of droplets from the gas flow by impact on the bottom of the upper plate as the upper plate deflects the flow of gas through the holes in the lower plate. Deentrained droplets coalesce into films as they impact, and the liquid drips back to the plate from which it was entrained as the films grow. In general, the spacing between the plates should be no less than (and not much greater than) one-fourth the average diameter of the perforations in the lower plate, so that the flow resistance between the plates will be no greater than the flow resistance of the lower plate. In effect, the double plate introduces an impedance mismatch between the volume beneath the plates and that contained between the plates and prevents the transmittal of lower frequency, larger scale pressure fluctuations into and through the space between the plates, not only reducing liquid entrainment, but lowering the dumping point as well.

Figure 3:
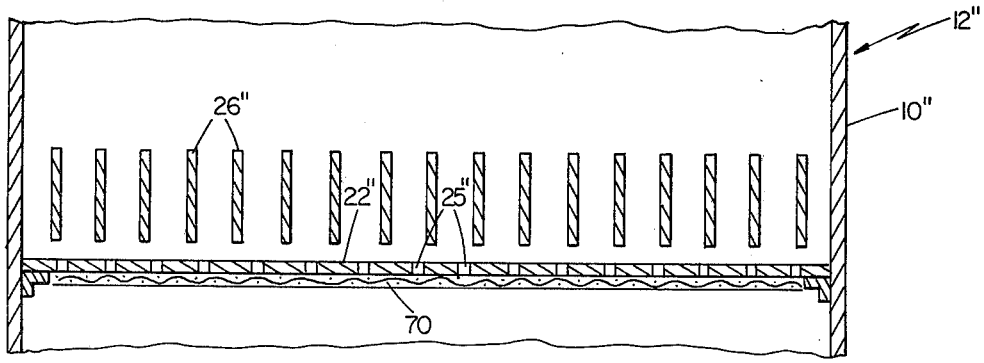
FIG. 3 is a vertical sectional view taken along the same plane as is FIG. 2, but showing an alternate to the double plate embodiment of FIG. 2.

Results similar to those obtained with the double plate configuration may be obtained by placing a suitable porous matrix material beneath plate 22" instead of a second plate. Referring to FIG. 3, the porous material 70 (e.g., 8 layers of stainless steel mesh totalling one-fourth inch thick) is in contact with the underside of plate 22" and has a flow resistance not substantially less than that of the plate itself in a sufficiently limited depth so that the flow capacitance of the porous material is sufficiently small. This material will reduce the amplitude of pressure fluctuations under the plate and increase their frequency in a manner similar to that of the double plate configuration.

In operation, the reduction in liquid entrainment makes possible operation of the tower, in either the froth or spray regime (though preferably in the spray regime), at a desired low overall liquid flow rate without the need for liquid recirculation. In particular, as explained in my above-identified copending application, liquid can flow at a rate below the entrainment-limited minimum liquid flow rate operative in the absence of the invention.

Operation in the spray regime, even at higher liquid flow rates, has the advantage of reducing sulfite oxidation, as described above. In spray regime operation the baffles inhibit the tendency for large scale eddies (which reduce sulfite concentration gradient across the tray and hence reduce mass transfer) to develop in the mobile spray dispersion.

In either regime, the elimination of recirculation increases the sulfite gradient on each tray, thus increasing the driving force for $SO_2$ absorption.

In some embodiments the reduction in entrainment produced by the double plate configuration, or the alternate arrangement of FIG. 3, with or without the zigzag deentrainment mesh, may be sufficient even without the baffles to give the advantages of no recirculation and reduced oxidation. Similarly, in some embodiments (most likely in the spray regime) the zigzag mesh by itself may be enough to give these advantages. However, presently preferred embodiments of the invention do involve use of the baffles as described.

Other embodiments are within the following claims.

I claim:

1. In an $SO_2$ scrubbing process comprising supplying gas to be scrubbed through an orificed tray in a contacting and separating stage of the cross-flow type having gas and scrubbing liquid inlets thereto, wherein said tray is mounted in effective communication with both said inlets to permit gas to rise through said tray to contact liquid thereabove and produce a two phase dispersion of gas and liquid supported on said tray, that improvement comprising reducing liquid entrainment by providing a multiplicity of spaced, generally vertical baffles above said tray, said baffles extending generally in the direction of liquid flow across said tray and being sufficiently close together to substantially reduce the amplitude of vertical oscillations in said dispersion having a wavelength which is small relative to the width of said tray, reducing the rate of liquid flow along said tray sufficiently to permit carrying out said process without the need for liquid recirculation at said stage, and carrying out said process without said recirculation.

2. The improvment of claim 1 wherein the liquid flow rate along said tray has an effective lower limit related to the rate of said liquid entrainment in the absence of said baffles, and said process includes the step of reducing said liquid flow rate to below said limit.

3. The improvement of claim 1 wherein said process is carried out at a plurality of successive said stages, each with its own tray and baffles.

4. The improvement of claim 1 wherein said scrubbing liquid is a solution of $Na_2SO_3$.

5. The improvement of claim 1 further comprising the step of carrying out said process with said dispersion in the spray regime.

6. The improvement of claim 1 wherein said entrainment is further reduced by providing means mounted beneath said tray to form a flow resistance sufficiently close to the underside of said tray to substantially reduce pressure coupling beneath the underside of said tray and the main volume of vapor beneath said tray, whereby said minimum permissable vapor velocity and said dumping point are correspondingly lowered.

7. The improvement of claim 6 wherein said means is a perforated plate spaced beneath said tray.

8. The improvement of claim 7 wherein said tray is a plate having perforations misaligned with those of said means.

9. The improvement of claim 7 wherein the spacing between said tray and said perforated plate is no less than one-fourth the average diameter of the perforations in said plate.

10. The improvement of claim 6 wherein said means is porous mesh mounted in contact with the undersurface of said tray.

11. The improvement of claim 10 wherein said mesh has a flow resistance not substantially less than the flow resistance of said tray.

12. The improvement of claim 1 wherein said entrainment is further reduced by an impingement type separator mounted about said tray in the path of vapor passing to the stage above, said separator having its major surfaces tilted at 45°-75° to the horizontal and extending generally parallel to the direction of liquid flow along the tray.

13. In a gas-liquid contacting process of the type in which it is desired to have a high gas phase mass transfer rate and a low liquid phase mass transfer rate, comprising supplying gas through an orificed tray in a contacting and separating stage of the cross-flow type having gas and liquid inlets thereto, wherein said tray is mounted in effective communication with both said inlets to permit gas to rise through said tray to contact liquid thereabove and produce a two phase dispersion of gas and liquid supported on said tray, that improvement comprising, reducing liquid entrainment sufficiently below the rate of liquid supply to said tray to enable efficient operation in the spray regime, and carrying out said process with said dispersion in the spray regime.

14. The improvement of claim 13 in an $SO_2$ scrubbing process.

15. The improvement of claim 14 wherein said scrubbing liquid is a solution of $Na_2SO_3$.

16. The improvement of claim 13 wherein said entrainment rate is reduced to no more than 20% of said liquid supply rate.

17. The improvement of claim 13 wherein said entrainment rate is reduced by providing an impingement type separator mounted above said tray in the path of vapor passing to the stage above, said separator having its major surfaces tilted at 45°-75° to the horizontal and extending generally parallel to the direction of liquid flow along the tray.

18. The improvement of claim 17 wherein said process is carried out at a plurality of successive said stages, each with its own said tray and separator.

19. The improvement of claim 13 wherein the free area of said tray is sufficiently low that the momentum of gas flow through said tray is not substantially less than the liquid head on said tray.

20. In an $SO_2$ scrubbing process comprising supplying gas to be scrubbed through an orificed tray in a contacting and separating stage of the cross-flow type having gas and scrubbing liquid inlets thereto, wherein said tray is mounted in effective communication with both said inlets to permit gas to rise through said tray to contact liquid thereabove and produce a two phase dispersion of gas and liquid supported on said tray, that improvement comprising reducing liquid entrainment by providing an impingement type separator mounted above said tray in the path of vapor passing to the stage above, said separator having its major surfaces tilted at 45° -75° to the horizontal and extending generally parallel to the direction of liquid flow along the tray, reducing the rate of liquid flow along said tray sufficiently to permit carrying out said process without the need for liquid recirculation at said stage, and carrying out said process without said recirculation.

21. The improvement of claim 20 wherein said separator comprises a zigzag arrangement of porous material extending generally across said stage and having its vertices generally parallel to the direction of liquid flow along said tray.

22. The improvement of claim 21 wherein the major surfaces of said porous material extend at approximately 60° to the horizontal.

* * * * *